US008655758B2

(12) United States Patent
Dweck et al.

(10) Patent No.: US 8,655,758 B2
(45) Date of Patent: Feb. 18, 2014

(54) FINANCIAL TRANSACTION MODELING SYSTEM

(75) Inventors: Jay S. Dweck, Armonk, NY (US); Pantelis G. Tsoucas, Mount Kisco, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 13/176,007

(22) Filed: Jul. 5, 2011

(65) Prior Publication Data

US 2011/0264574 A1    Oct. 27, 2011

Related U.S. Application Data

(63) Continuation of application No. 11/075,229, filed on Mar. 8, 2005, now Pat. No. 7,996,290.

(60) Provisional application No. 60/551,498, filed on Mar. 9, 2004.

(51) Int. Cl.
*G06Q 40/00*      (2012.01)
(52) U.S. Cl.
USPC .......................................................... 705/35
(58) Field of Classification Search
USPC .......................................................... 705/35
See application file for complete search history.

(56) References Cited

U.S. PATENT DOCUMENTS

| | | | |
|---|---|---|---|
| 6,061,692 A | 5/2000 | Thomas et al. | |
| 6,571,285 B1 | 5/2003 | Groath et al. | |
| 6,745,382 B1 | 6/2004 | Zothner | |
| 6,748,555 B1 | 6/2004 | Teegan et al. | |
| 6,789,252 B1 | 9/2004 | Burke et al. | |
| 6,816,842 B1 | 11/2004 | Singh et al. | |
| 6,883,172 B1 | 4/2005 | Angeline et al. | |
| 6,895,575 B2 | 5/2005 | Dharamshi | |
| 6,910,204 B1 | 6/2005 | Rossomando | |
| 7,020,869 B2 | 3/2006 | Abrari et al. | |
| 2001/0005829 A1* | 6/2001 | Raveis, Jr. | 705/1 |
| 2002/0152422 A1 | 10/2002 | Sharma et al. | |
| 2002/0188556 A1 | 12/2002 | Colica et al. | |
| 2003/0036917 A1 | 2/2003 | Hite et al. | |
| 2004/0002910 A1* | 1/2004 | Mizukami | 705/36 |
| 2004/0039689 A1* | 2/2004 | Penney et al. | 705/38 |

OTHER PUBLICATIONS

Garner, Black, "Black's Law Dictionary", Thomson-West, 2004, 8th edition, p. 341.
Kevin Donovan, "Asset Securitization Report," pITEM0216100F, Jun. 3, 2002, 1 page.
Akil Salim Roper, "Emerging Market Debt Report", pITEM99340004, Dec. 6, 1999, 1 page.
Maria Trompy, "New Data Transformation Model Gains Momentum", Jan. 12, 2004, 2 pages.
Mikalsen, Thomas et al., "Transactional Business Process Services: Definition and Requirements", 12 pages.

(Continued)

*Primary Examiner* — Hani M Kazimi
*Assistant Examiner* — Hatem M Ali
(74) *Attorney, Agent, or Firm* — Perkins Coie LLP

(57) ABSTRACT

Systems and methods are provided to model financial transactions. According to some embodiments, simple events, branch events, composite events, and/or contingent events associated with a financial transaction are defined. The events may then be used to automatically manage the transaction during the transaction's lifecycle.

28 Claims, 20 Drawing Sheets

(56) References Cited

OTHER PUBLICATIONS

Technical Standard, "Distributed Transaction Processing: The XA Specification", The Open Group, X/Open CAE Specification (1991), .COPYRGT. Dec. 1991, X/Open Company Limited. 31 pages.

Organization for the Advancement of Structured Information Systems. "Business Transaction Protocol Primer", An OASIS Committee Supporting Document, Version 1.0, Jun. 3, 2002. Retrieved from Internet: URL: http://www.oasis-open.org/committees/business-transactions/documents/-primer/Primerhtml/BTP%20Prime., 32 pages.

Protocol Stack, image dated 2003 (unverified web-based date), The Computer Language Co, Computer Desktop Encyclopedia, http://dictionary.zdnet.com/definition/protocol+stack.html (pp. 1-3 of the NPL document submitted herewith).

Software from FOLDOC, Jul. 21, 2002 (unverified web-based date), Foldoc, http://foldoc.org/software (p. 4 of the NPL document submitted herewith).

Griffel et al., Electronic contracting with COSMOS—how to establish, negotiate and execute electronic contracts on the Internet, Enterprise Distributed Object Computing Workshop, 1998, EDOC '98 Proceeedings, Second International, Nov. 3-5, 1998, pp: 46-55 + cover sheet (pp. 13-24 of the NPL document submitted herewith).

Yakimovich, et al., Software architecture classification for estimating the cost of COTS integration, International Conference on Software Engineering, Proceedings of the 21st international conference on Software engineering, 1999, pp. 296-302 (pp. 25-31 of the NPL document submitted herewith).

Turing et al., Systems of Logic Based on Ordinals, 1939 (unverified web-based date), Proc. Lond. Math. Soc (2) 45 pp. 161-228. [Accessed at http://www.turingarchive.org/browse.php/B/15,] (pp. 32-90 of the NPL document submitted herewith).

Gamma et al, Design Patterns: Elements of Reusable Object-Oriented Software, copyright 1995, Addison-Wesley, 1ed, 17th printing, p. 139 (pp. 5-12 of the NPL document submitted herewith).

\* cited by examiner

| TRANSACTION IDENTIFIER 210 | DESCRIPTION 220 | STATUS 230 |
|---|---|---|
| T01_001 | LIBOR ON 01JUN06 | DONE (1.75) |
| T01_002 | PAY 100 USD ON 18JUN06 | PENDING |
| T01_003 | IF T01_001<1.90 THEN T01_002 | PENDING |
| T02_001 | LIBOR ON 01JUL06 | PENDING |
| T02_002 | PAY 100 USD ON 18JUL06 | PENDING |
| T02_003 | IF T02_001<1.90 THEN T02_002 | PENDING |
| T03_001 | T01 AND T02 | IN PROCESS |

| MO TYPE 1402 | RULE ID 1404 | PRE-CONDITION 1406 | POST-CONDITION 1408 |
|---|---|---|---|
| MO1 | MO1_R1a | $EVENT_1(MO) + STATE_1$ | $COMPONENT_2::ACTION_1(MO)$ |
| MO1 | MO1_R2 | $RESPONSE_1(ACTION_1(MO)) + STATE_1$ | $STATE_2$ |

FINANCIAL TRANSACTION MODELING SYSTEM

CROSS-REFERENCE TO RELATED APPLICATIONS

This is a Continuation of and claims priority under 35 U.S.C. §120 to prior U.S. patent application Ser. No. 11/075,229, filed Mar. 8, 2005, entitled "Financial Transaction Modeling System," which claims the benefit of U.S. Provisional Application No. 60/551,498 entitled "Financial Transaction Modeling System" and filed Mar. 9, 2004 and also related to U.S. patent application Ser. No. 11/075,206 entitled "System and Methods to Facilitate State Transitions for Managed Business Objects". The entire contents of the aforementioned applications are expressly incorporated herein by reference.

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to financial transaction modeling. In particular, the present invention relates to systems and methods to facilitate modeling of different types of financial transactions.

BACKGROUND

A party who agrees to enter into a transaction may need to define a number of different terms associated with the transaction. For example, the party may want to define when and how periodic payments will be made, the ways in which the amount of various payments will be calculated, and/or how various events will be handled during the transaction's lifecycle (e.g., when the other party want to cancel the transaction). By accurately defining the terms of the transaction, various parties can understand and reach an agreement as to how the transaction will be performed.

To facilitate the definition of such a transaction, a party may use a pre-defined type of transaction agreement, such as one associated with the International Swaps and Derivatives Association (ISA) master agreement or other types of agreement structures. In some cases, a financial tool-kit such as the ones available from LEXIFI SAS of France may be used to help describe the transaction. Similarly, the Financial Products Markup Language (FPML), which is an Extensible Markup Language (XML) standard for over-the-counter trading among financial instructions, may be used to implement pre-defined contract terms, parties, and/or payments associated with a transaction.

Different types of transactions, however, will be associated with different types of terms and conditions. Thus, a new type of transaction might require that an existing agreement modeling language be modified to support a new type of term in order to fully and accurately describe the transaction. By way of example, a new FPML term might need to be manually created in order to describe a new type of transaction. As a result, the automation of a transaction definition system may be limited (e.g., because a user needs to manually create a new term to describe a new type of transaction). Moreover, manually creating new terms can increase the cost and time required to define a new transaction—especially when a complex transaction is being created. In addition, errors may occur when a new term is created (e.g., a new term might have an unintended consequence under certain conditions) and such errors can be difficult to discover and resolve.

SUMMARY

To alleviate problems inherent in the prior art, the present invention introduces a financial transaction modeling system.

In one embodiment of the present invention, at least one simple event associated with an asset transfer is defined, including a transfer amount and a transfer date. At least one branch event associated with a set of simple events is also defined, including a branch date and a branch selector. In addition, at least one composite event associated with a plurality of the simple events or branch events is defined. The transaction may then be automatically managed during the transaction's lifecycle based at least in part on the simple events, the branch events, and the composite events.

Another embodiment comprises: means for defining at least one simple event associated with an asset transfer, including a transfer amount and a transfer date; means for defining at least one branch event associated with a set of simple events, including a branch date and a branch selector; means for defining at least one composite event associated with a plurality of the simple events or branch events; and means for automatically managing the transaction during the transaction's lifecycle based at least in part on the simple events, the branch events, and the composite events.

With these and other advantages and features of the invention that will become hereinafter apparent, the invention may be more clearly understood by reference to the following detailed description of the invention, the appended claims, and the drawings attached herein.

DETAILED DESCRIPTION

Some embodiments of the present invention are associated with "transactions" and/or "agreements" between parties. As used herein, the terms "transaction" and/or "agreement" may refer to any arrangement between the parties. A transaction might be, for example, a legal contract defining a set of rights that exist between the parties, such as an ISDA master agreement associated with financial instruments and/or products (e.g., associated with an interest rate, a currency, a commodity, an energy value, a credit, or an equity). Note that a single agreement may be associated with more than two parties. Also note that an agreement may or may not be legally binding (e.g., an agreement may simply reflect an informal understanding between parties). In addition, as used herein the term "party" can refer to any entity associated with a transaction or agreement. A party may be, for example, a business, a business entity (e.g., a department within a business), or a person.

Transaction Modeling System

Figure 1:
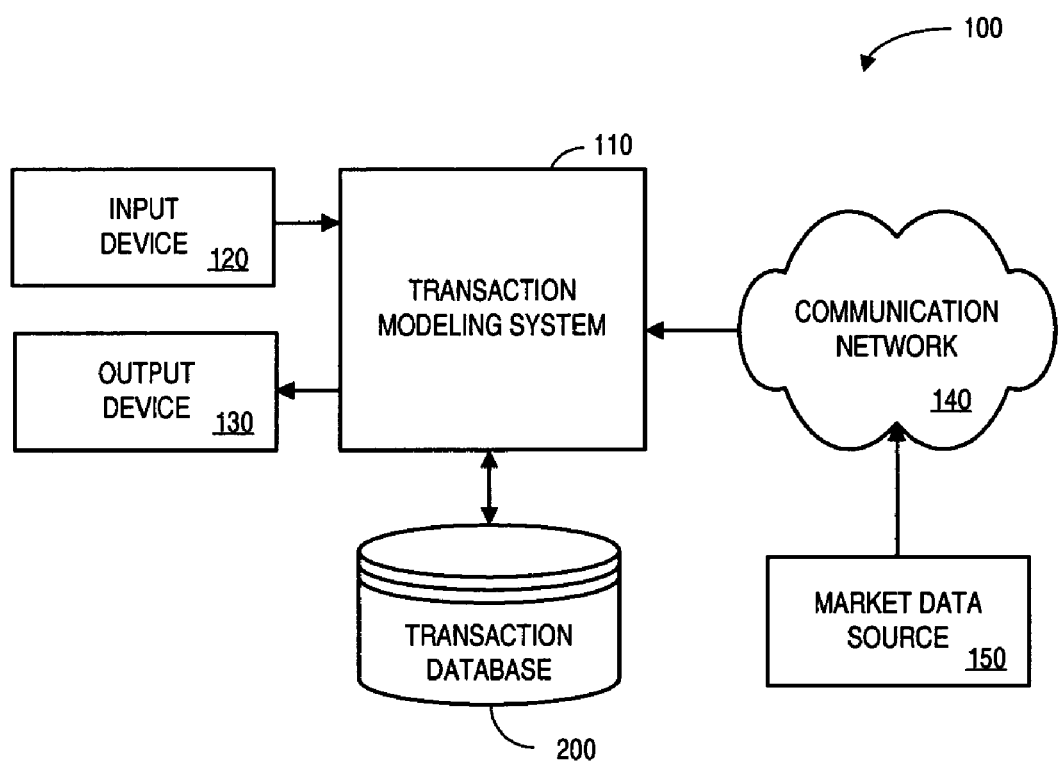
FIG. 1 is a block diagram overview of a system according to some embodiments.

FIG. 1 is a block diagram overview of a system 100 according to some embodiments. The system 100 includes a transaction modeling system 110 that may receive transaction information from an input device 120. The input device 120 might be, for example, a keyboard, a database, or a remote Personal Computer (PC) associated with a user or a party to a transaction. The transaction modeling system 110 may also provide transaction information to an output device 130. The output device 130 might be, for example, a computer monitor, a printer, a remote PC, or a system or device associated with a party to a transaction.

The transaction modeling system 110 may also receive information from a market data source 150 via a communication network 140. By way of example, the communication network 140 might include a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network (e.g., in accordance with an 802.11 standard), and/or an Internet Protocol (IP) network such as the Internet, an intranet, or an extranet.

According to one embodiment, the transaction modeling system 110 receives financial information from a market data backbone via the communication network 150. One example of such a market data backbone is the TIB® Market Data Distribution System that provides financial information in substantially real time.

Financial information might also be received from a user (e.g., via the input device 120). For example, the user might enter financial information using a keyboard. According to still other embodiments, financial information is received from another application, such as the MICROSOFT® EXCEL spreadsheet application, or a data file.

Although a single transaction modeling system 110 is shown in FIG. 1, any number of transaction modeling systems 110 may be included according to embodiments of the present invention. Similarly, any number of other devices or components described herein (e.g., input devices 120) may be included. Also note that different devices could be incorporated in a single physical device.

The transaction modeling system 110 may also exchange information with a transaction database 200. One example of a transaction database 200 will now be provided with respect to FIG. 2. The illustrations and accompanying descriptions of the databases presented herein are exemplary, and any number of other database arrangements could be employed besides those suggested by the figures.

Transaction Database

Figure 2:
FIG. 2 is a portion of a transaction database according to some embodiments.

Referring to FIG. 2, a table represents a transaction database 200 according to one embodiment of the present invention. The table includes entries that define one or more transactions and/or related values or events. The table also defines fields 210, 220, 230 for each of the entries. The fields specify: a transaction identifier 210, a description 220, and a status 230. The information in the transaction database 200 may be created and updated based on, for example, information received from an input device 120. According to some embodiments, the user may provide the information via a Graphical User Interface (GUI).

According to some embodiments, a transaction is created by defining a number of values and/or events in the transaction database 200. In this case, the transaction identifier 210 may be, for example, an alphanumeric code associated with a transaction and a value or event. In the example illustrated in FIG. 2, the transaction identifier 210 comprises a three character transaction label concatenated with a three character value or event label (e.g., the first three entries represent events associated with transaction "T01").

The description 220 defines the associated value or event. For example, the first entry is defined as being the London Inter-Bank Offer Rate (LIBOR) value on Jun. 1, 2006. Note that as used herein, an "event" may refer to a component of a transaction. For example, the second entry is an event comprising the payment of one hundred United States dollars on Jun. 18, 2006. The status 230 may indicate the status of the value or event (e.g., whether the value or event has been done or is now pending).

Transaction Modeling Method

Figure 3:
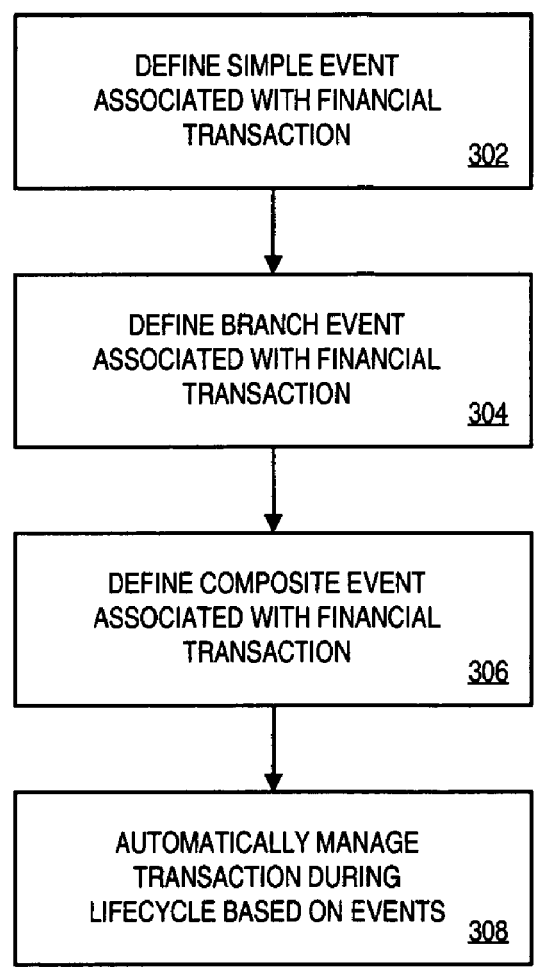
FIG. 3 is a flow chart of a transaction modeling method according to some embodiments.

FIG. 3 is a flow chart of a transaction modeling method according to some embodiments. The method might be performed, for example, by the transaction modeling system 110 of FIG. 1.

At 302, at least one "simple event" associated with a financial transaction is defined. As used herein, a "simple event" may refer to, for example, an "asset" transfer.

As used herein, the term asset might refer to, for example, a financial instrument, commodity, and/or cash, which has an unambiguous value (given a specific valuation methodology), at any point in time, and which a party might elect to value or, for which, a party might calculate risk, manage risk, or report metrics. A simple event might be defined, for example, by entering a transfer amount and a transfer date into the input device 120.

By way of example, a simple event might be a cashflow to be exchanged on a predetermined date (e.g., as represented by T02_002 in FIG. 2). In addition to a payment date, a simple event might include a denomination (e.g., representing a currency that will be used for the asset transfer) and signed position (e.g., indicating a long or short position). Note that asset transfer does not have to be a cashflow. For example, an asset transfer might be associated with an equity, a debt, a security, a commodity, a physical or real-estate object, and/or a derivative.

Also note that the value of the transfer amount might not be pre-determined at the time a simple event is created. For example, a simple event could be defined using an expression that includes one or more dynamic values (e.g., a LIBOR value as of a particular date).

According to some embodiments, a "financial observable" may be defined to represent such dynamic values. A financial observable might be, for example, a published value represented by a name and an observation date that is received from the market data source 150 or from a user via the input device 120 (e.g., the price of a particular stock when the market closes on a particular date). Other examples of financial observables may be associated with a financial security, a market price, and/or a weather condition. The first entry in FIG. 2 is one example of a financial observable.

At 304, at least one "branch event" associated with the transaction is defined. As used herein, a "branch event" may be associated with, for example, a set of simple events, one of which may be performed. A branch event might be defined, for example, by entering a branch date and a branch selector into the input device 120. The branch selector may be, for example, a condition defining which of the events will occur. For example, the branch event T02_003 in FIG. 2 indicates that T02_002 (a simple event) will occur if T02_001 (a financial observable) is less than 1.90. Note that the set of events associated with this branch events includes only a single event. Other branch events might be associated with two or more events.

At 306, at least one "composite event" associated with the transaction is defined. As used herein, a "composite event" may refer to, for example, a plurality of events that are somehow linked (e.g., including simple events, branch events, other composite events, and/or any other types of events). A composite event might be defined, for example, by entering a list of transaction identifiers of the associated events into the input device 120. Consider, for example, a series of periodic payments that need to be made during a transaction's lifecycle. In this case, each payment could be represented using a separate simple event and a composite event might be defined as the set of those simple events. The use of composite events might simplify the definition and/or management of a transaction (e.g., an entire series of coupon payments might be canceled by canceling a single composite event). As another example, a composite event might represent a set of different types of events associated with a particular date.

At 308, the transaction is automatically managed during the transaction's lifecycle based at least in part on the simple events, the branch events, and the composite events. For example, the transaction modeling system might use information in the transaction database 200 and/or information received from the market data source 150 to manage the transaction. According to some embodiments, the transaction is managed by automatically transferring an asset and/or automatically transmitting an indication to a party associated with the transaction. For example, a reminder might be generated and transmitted to a party when a coupon payment becomes due. Other actions associated with managing a transaction might include canceling a transaction, extending a transaction, and/or receiving supplemental information from a party associated with a transaction.

According to some embodiments, managing a transaction involves managing a risk associated with the transaction. For example, an amount of market risk, interest rate risk, and/or credit risk might be calculated and used to manage the transaction.

Moreover, managing a transaction might include calculating a financial value associated with the transaction. For example, a financial value might be calculated based at least in part on the simple events, the branch events, and the composite events. The financial value might be associated with, for example, a net present value, a credit valuation adjustment, a discount value, and/or a cashflow amount. Techniques that might be used to perform the calculation include Monte Carlo type simulations, recursive calculations, backward induction, discount curve pricing, Value At Risk (VAR), Credit Value Adjustment (CVA), average life calculations, and/or probability of exercise values.

Note that a financial value associated with a transaction might depend at least in part on a pricing date. For example, a net present value of a transaction calculated with respect to one date might be different that the net present value calculated with respect to another date. Consider a transaction associated with a start date and an end date. In this case, the pricing date might be the current date or another arbitrary date (e.g., between the start date and the end date). The financial value might then be calculated as of, for example, financial observable values as they existed or were known on the pricing date. Moreover, the financial value might be based at least in part on an economically optimized action or decision.

Transaction Modeling Examples

Figure 4:
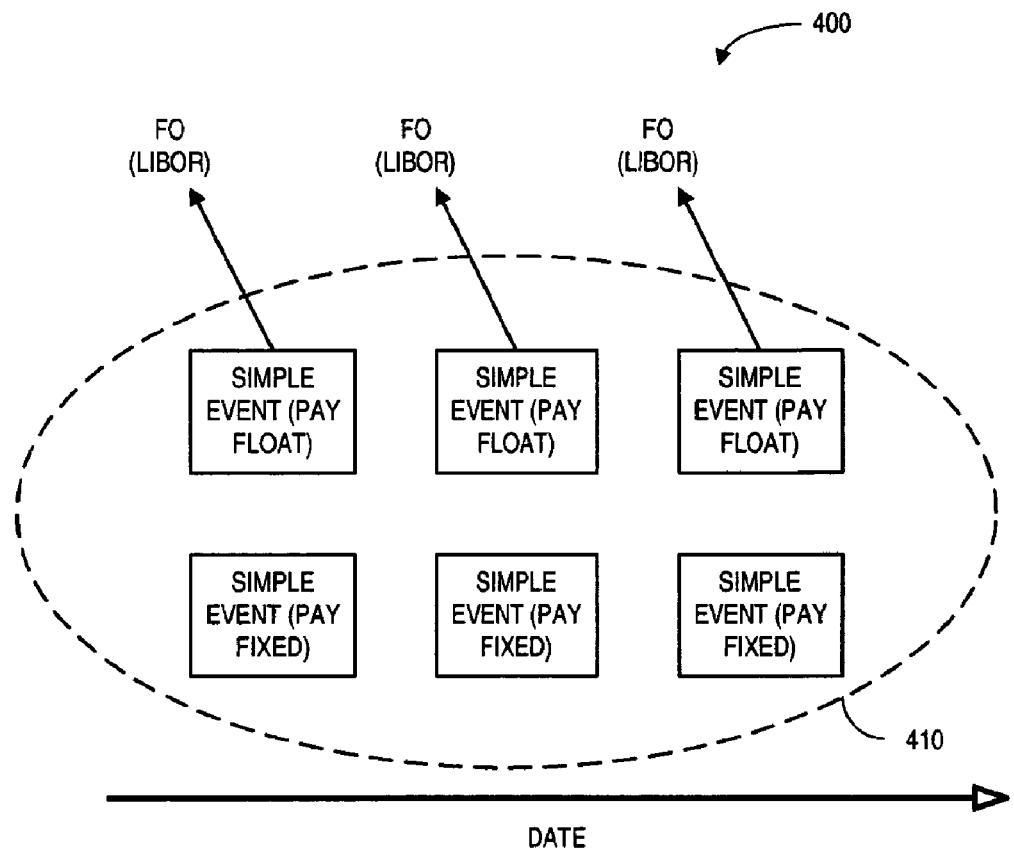
FIG. 4 illustrates a transaction model including simple events according to some embodiments.

Embodiments described herein may be associated with different types of financial transactions. As one example, a contract such as a "swap agreement" might be modeled and managed according to any of the embodiments described herein. One type of swap agreement is a transaction in which a party pays fixed periodic amounts of one currency and another party pays fixed periodic amounts of another currency. Note that payments might be calculated on a notional amount, and the swap might involve initial and/or final payments that correspond to the notional amount. Other examples of financial transactions might involve a loan, a security, a financial instrument, or a derivative or insurance contract In some swap agreements, payments are made in connection with both a fixed rate and a floating rate. FIG. 4 illustrates a transaction model 400 for such a fixed/floating swap agreement according to some embodiments. The square elements in the model 400 represent simple event that have been defined for the transaction. Thus, on a first date two simple elements have been defined, including: (i) a simple event indicating that a party will pay a fixed amount, and (ii) a simple event indicating that a party will pay a floating amount based on a financial observable associated with a LIBOR value. Note that the date associated with the financial observable might be a date other than the date of the simple event. Similar pairs of simple events are associated with other dates during the lifecycle of the fixed/floating swap agreement. The entire set of events might be associated with a single composite event 410 that represents the transaction (as represented by a dashed line in FIG. 4).

Figure 5:
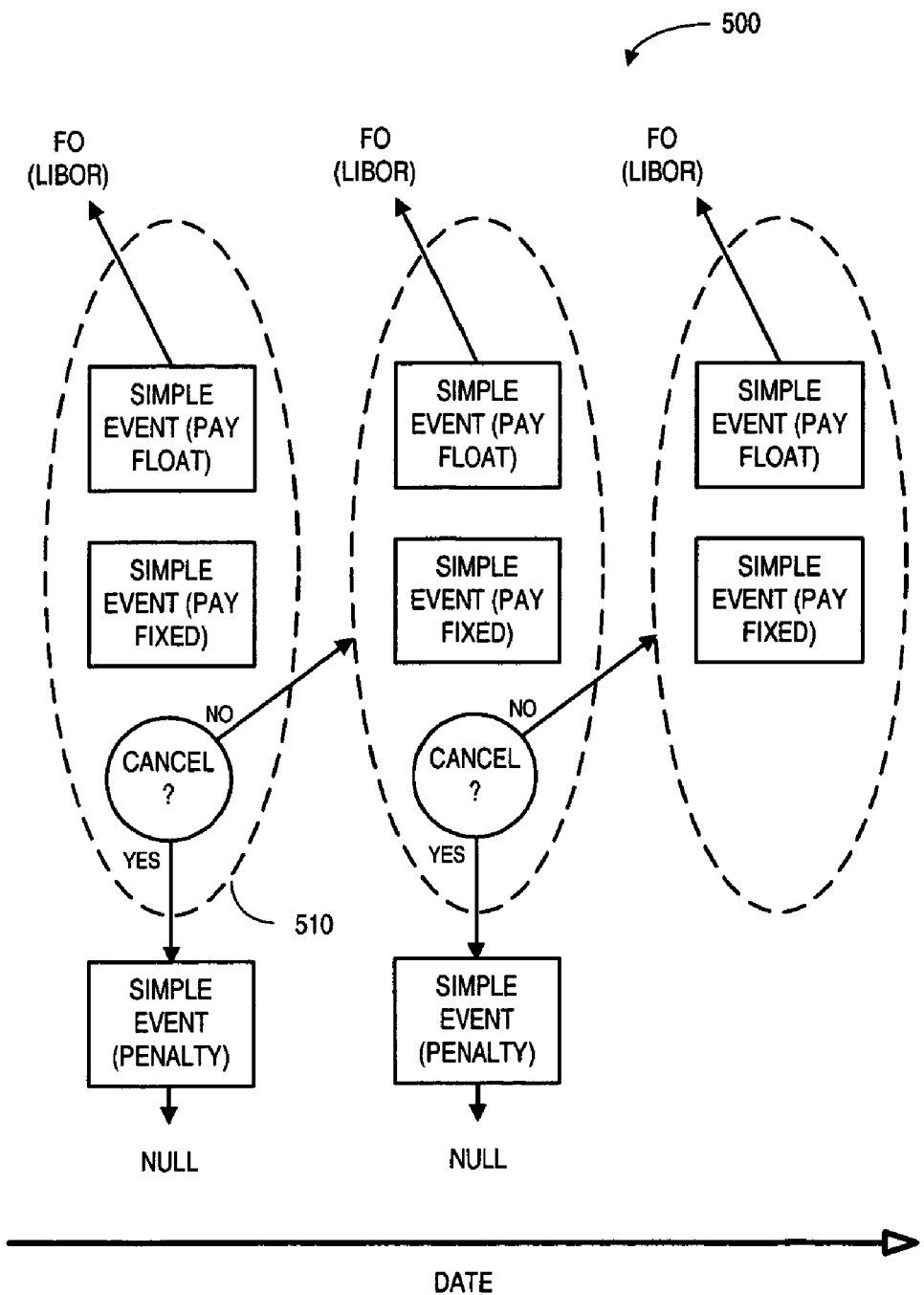
FIG. 5 illustrates a transaction model including contingent events according to some embodiments.

As another example, in some swap agreements a party will periodically have the right to cancel the transaction. For example, a party might periodically have the right to pay a penalty amount in order to cancel the transaction. FIG. 5 illustrates a transaction model 500 for such a cancelable swap agreement according to some embodiments. As before, on a first date two simple elements have been defined, including: (i) a simple event indicating that a party will pay a fixed amount, and (ii) a simple event indicating that a party will pay a floating amount based on a financial observable associated with a LIBOR value.

In this case, however, a "contingent event" is also defined on that date (represented by a circle in FIG. 5). As used herein, a "contingent event" may refer to, for example, a set of other events, one of which a party may decide to perform. A contingent event might be defined, for example, by entering a contingency date and a contingency selector into the input device 120. The contingency selector may be, for example, associated with information provided by a party to the transaction (e.g., indicating whether or not the transaction will be cancelled). The two simple events and the contingent event are associated with a single composite event 510. An additional simple event indicating that a party will pay a penalty amount is also defined on that date (although it is not included in the composite event). Similar sets of events are defined on other dates during the transaction's lifecycle.

When the transaction reaches the first date for which events are defined, the simple events associated with paying the fixed and floating amounts are performed. For example, a transaction modeling system 110 might calculate the floating amount (e.g., based on a previous LIBOR value), automatically arrange for payments to be made as appropriate, and/or notify one or more parties to the transaction (or other parties associated with the transaction) about the required asset transfers.

Because a contingent event is also defined on that date, the transaction modeling system 110 determines whether or not a party to the transaction has indicated that the transaction should be canceled. If so, the simple event associated with the payment of the penalty amount is performed and the transaction is canceled. If not, the next composite event 510 will be performed at the appropriate time.

Figure 6:
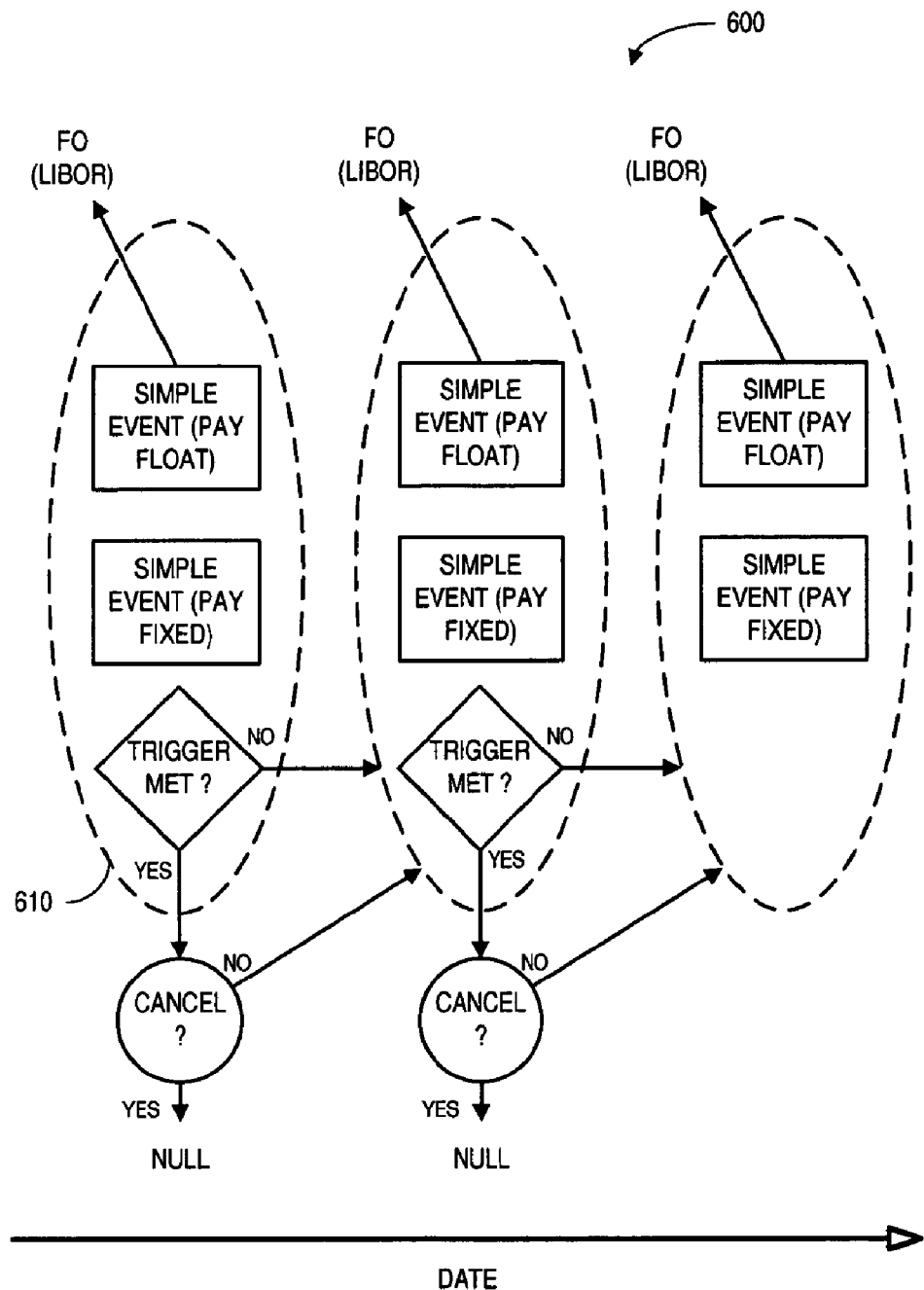
FIG. 6 illustrates a transaction model including branch events according to some embodiments.

As still another example, in some swap agreements a right to cancel the agreement will depend on a "trigger event" (e.g., a currency value). FIG. 6 illustrates a transaction model 600 for such a trigger cancelable swap agreement according to some embodiments. As before, on a first date two simple elements have been defined, including: (i) a simple event indicating that a party will pay a fixed amount, and (ii) a simple event indicating that a party will pay a floating amount based on a financial observable associated with a LIBOR value. Moreover, a contingent event is defined on that date and depends on whether or not a party indicates that the transaction will be canceled.

In this case, however, a branch event is also defined on that date (as represented by a diamond in FIG. 6) and represents whether or not a trigger condition has been met (e.g., whether or not the price of a certain bond has fallen below a predetermined threshold value). The simple events and the branch event on that date are associated with a single composite event 610 (and the contingent event is not). Similar sets of events are defined on other dates during the transaction's lifecycle.

When the transaction reaches the first date for which events are defined, the simple events associated with paying the fixed and floating amounts are performed. For example, a transaction modeling system 110 might calculate the floating amount and automatically arrange for payments to be made.

Because a branch event is also defined on that date, the transaction modeling system 110 determines whether or not the trigger event has been satisfied. If not, the party does not have the right to cancel the transaction and the next composite event 610 will be performed at the appropriate time.

If the trigger condition was satisfied, the contingent event on that date is performed. That is, it is determined whether or not the party chooses to cancel the transaction. If the party indicates that the transaction should be canceled, the transaction ends (e.g., by entering a "null" state). If the party does not cancel the transaction, the next composite event 610 will be performed at the appropriate time.

According to some embodiments, to facilitating pricing calculations a composite event will not include the entire set of events that are associated with a single branch event or contingent event. Moreover, note that according to one embodiment, the only types of events that are allowed be defined are simple events, composite events, and branch events. Similarly, according to another embodiments the only types of events that are allowed to be defined are simple events, composite events, and contingent events. According to yet another embodiment, the only types of events that are allowed to be defined are simple events, composite events, branch events, and contingent events. Such approaches might simplify the transaction modeling system while still allowing all types of transactions to be modeled.

The various types of events described herein can provide a flexible way to describe any number of different type of transactions. As a result, the definition of the events may be automated—which can reduce the time, costs, and errors associated with defining a new type of transaction. Moreover, as described with respect to FIGS. 9 through 19, the model might also be used to automatically manage different types of transactions.

Transaction Lifecycle

Figure 7:
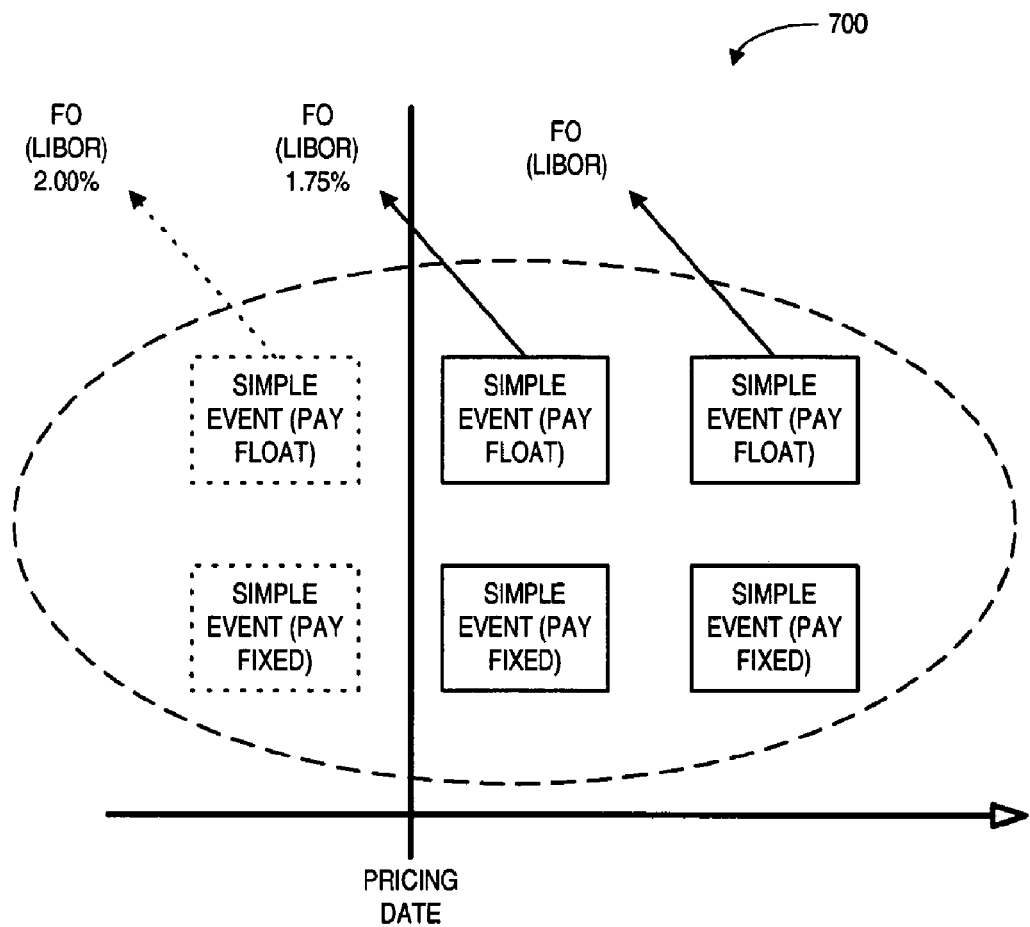
FIG. 7 illustrates an aged transaction model including simple events according to some embodiments.

In some embodiments, the transaction modeling system 110 is used to different points during the lifecycle of a transaction, such as by aging the transaction. For example, FIG. 7 illustrates an aged transaction model 700 including simple events according to some embodiments. In this case, assume that the pricing date illustrated in FIG. 7 represents the current date. Events that occurred prior to the pricing date (e.g., which have already been performed) are "masked" (as illustrated by dotted lines). That is, those events have been fixed and cannot be changed. Note that financial observables associated with a simple event might be masked even though the simple event itself has not been performed (e.g., when the observation date of the financial observable is prior to the date of the asset transfer). In this way, the current state of a financial instrument can be represented.

Figure 8:
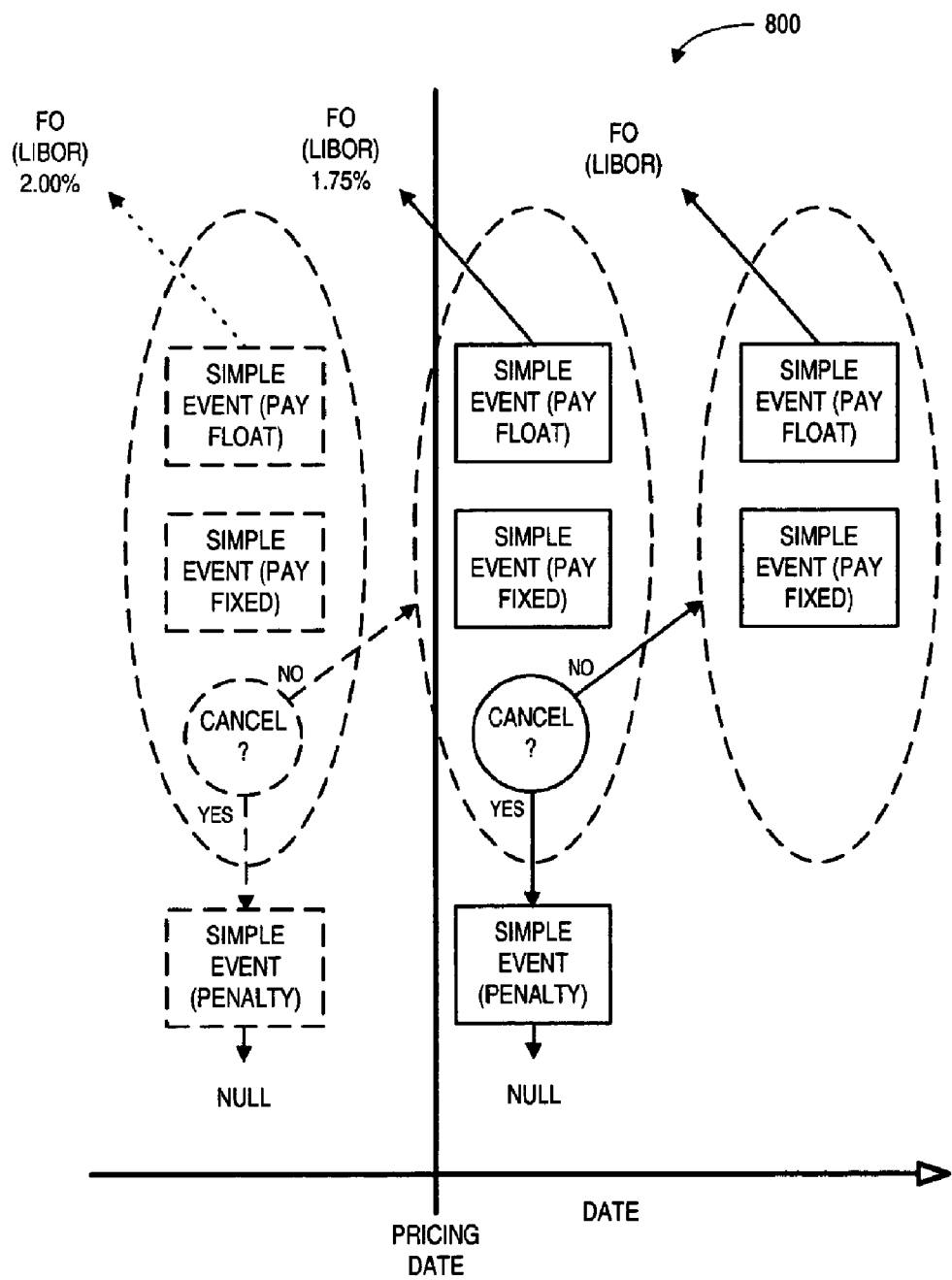
FIG. 8 illustrates an aged transaction model including contingent events according to some embodiments.

As another example, FIG. 8 illustrates an aged transaction model 800 including contingent events according to some embodiments. In this case, the first contingent event was not selected by a party. Note that the pricing date might be before or after the current date. Consider for example, a transaction having a start date of Jan. 1, 2005 and an end date of Dec. 31, 2015. Moreover, the current date is Jan. 1, 2010 and the pricing date is Jan. 1, 2007. In this case, the decisions and events that occurred between Jan. 1, 2007 and Jan. 1, 2010 would be ignored when calculating the transaction's net present value as of Jan. 1, 2007. Such an approach might be useful, for example, when attempting to "roll back" a transaction to resolve a previous error.

Control Engine Example

Note that an enterprise may need to manage a financial transaction during the transaction's lifecycle. For example, a party might enter into a transaction that must be tracked with respect to dates and/or financial market information associated with derivatives and risk management. Moreover, the status of the transactions may need to be maintained (e.g., a contract might be pending or canceled) and the party may need to keep track of different types of events associated with the transaction (e.g., a payment amount may need to be calculated and paid on a periodic basis). Tracking and managing such a transaction can be a time consuming and expensive process. The task may be even more difficult with respect to transactions that last for an extended period of time (e.g., a transaction might have a ten year lifecycle). Moreover, errors might occur (e.g., a payment might be calculated incorrectly) and be difficult to correct. In addition to defining financial observables, simple events, branch events, contingent events, and/or composite events, the transaction modeling system 110 might facilitate the use managed business objects to track and/or administer a transaction.

Figure 9:
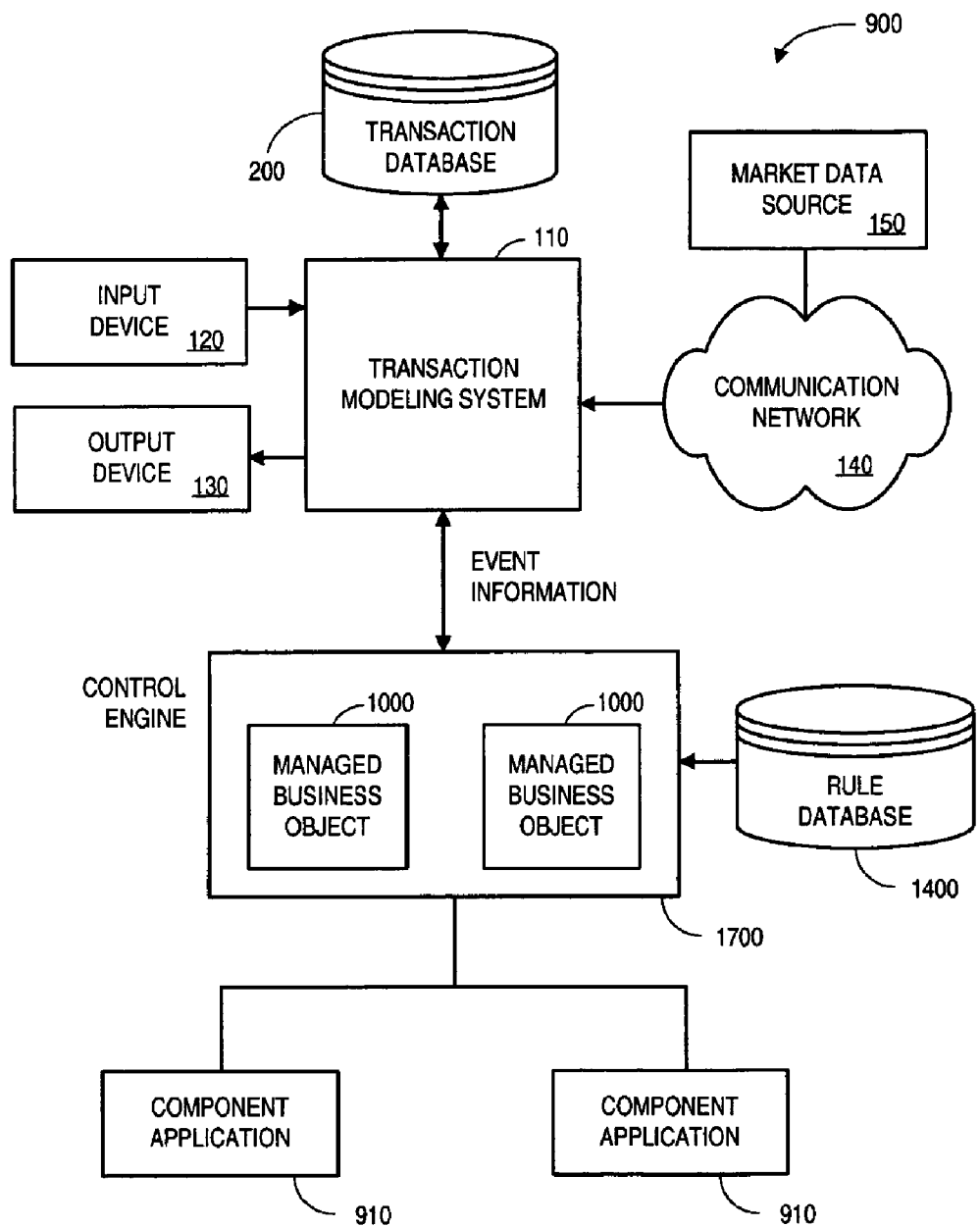
FIG. 9 is a block diagram overview of a system according to some embodiments.

For example, FIG. 9 is a block diagram overview of a system 900 according to some embodiments. As before, the system 900 includes a transaction modeling system 110 that may receive transaction information from an input device 120 and provide transaction information to an output device 130. In addition, the transaction modeling system 110 may receive information from a market data source 150 via a communication network 140. The transaction modeling system 110 may also exchange information with a transaction database 200.

According to this embodiment, a control engine 1700 exchanges event information with the transaction modeling system 110. For example, the control engine 1700 might receive an indication that a simple event has occurred (or needs to occur). As another example, the control engine 1700 might receive one or more rules from the transaction modeling system 110 based on events that have been defined by a user. The control engine 1700 might also transmit information to the transaction modeling system 110 when an action has been performed. According to another embodiment, a single device or application acts as both the transaction modeling system 110 and control engine 1700.

Moreover, the control engine 1700 may be able to exchange information with one or more component applications 910. The control engine 1700 and the component applications 910 may be any devices capable of performing the functions described herein, such as computers, servers, workstations, and networks.

The control engine 1700 manage a number of different business objects 1000. Note that there may be different types of managed business objects 1000, and that multiple instances of each type of managed business object may co-exist (e.g., the control engine 1700 might currently be managing three contract business objects and ninety cashflow business objects). As used herein, the phrase "managed business object" may refer to any information that represents a business or commercial item. A managed business object might represent, for example, a business abstraction (e.g., a cashflow) or a contract (e.g., associated a long-term obligation or a swap).

Each managed business object 1000 can be in one of a number of pre-defined "states." That is, at any time the managed business object 1000 exists in one of a set of states, each state representing some point in the lifecycle of the managed object (e.g., a contract status, cashflow state, or rate fix). The control engine 1700 may perform the concomitant (e.g., simultaneously and as a result of) management of the states of a set of such business objects. To facilitate the management of multiple business objects, each instance of a managed business object type may be associated with a identifier, such as a 128-bit identifier that is unique across an enterprise.

Figure 10:
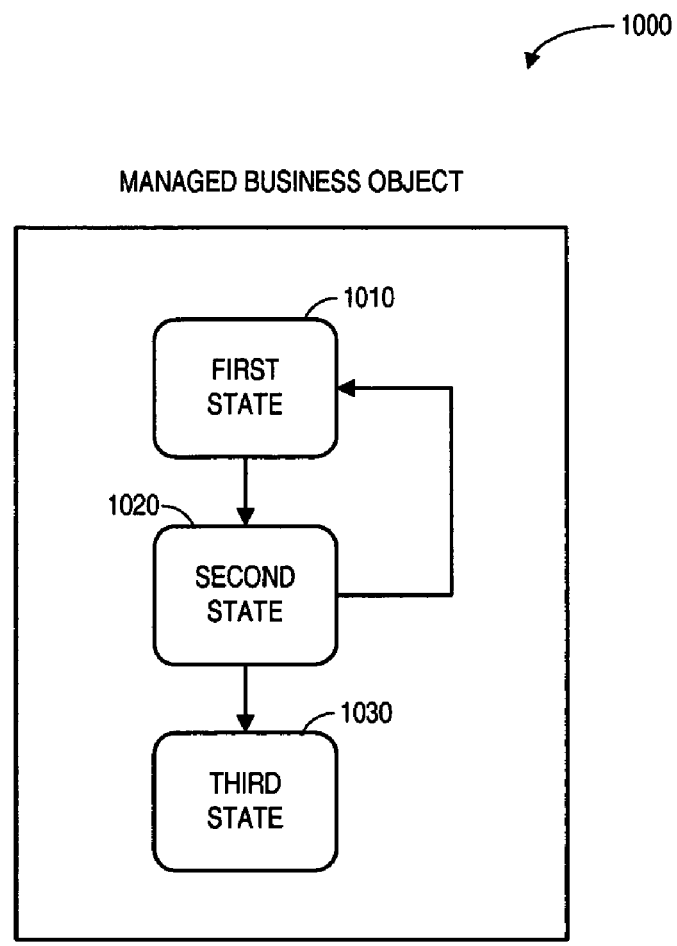
FIG. 10 illustrates managed business object states according to some embodiments.

FIG. 10 illustrates a managed business object 1000 according to some embodiments. In particular, the managed business object 1000 can be in a first state 1010 (e.g., a "new" state that is entered when the managed business object 1000 is created). The control engine 1700 may then transition the managed business object 1000 out of the first state 1010 and into a second state 1020. In some cases, the managed business object might enter one of a number of different states when it leaves a particular state. For example, the managed business object 1000 illustrated in FIG. 10 can return to the first state 1010 or enter a third state 1030 when it leaves the second state 1020.

Referring again to FIG. 9, the control engine 1700 may receive an "event" notification, such as notification that an asset has been transferred or that a contingent event has (or has not) been selected by a party to a transaction. Note that in some embodiments, an event notification might also be received from a component application 910. According to some embodiments, events are "irrefutable" (e.g., the system 900 cannot refuse to acknowledge the event) and reflect that some human, time, or data condition has occurred related to a managed business object 1000. In some cases, an event notification might represent an asynchronous event, and/or a number of different, potentially competing, event notifications could exist (e.g., one event notification might indicate that an order should be shipped to a customer while another one indicates that the order should be canceled).

As will now be described, the control engine 1700 may then adjust the state of a managed business object (e.g., to reflect that a payment has been received) based on the event notification and one or more rules stored in a rule database 1400.

Control Engine Method

Figure 11:
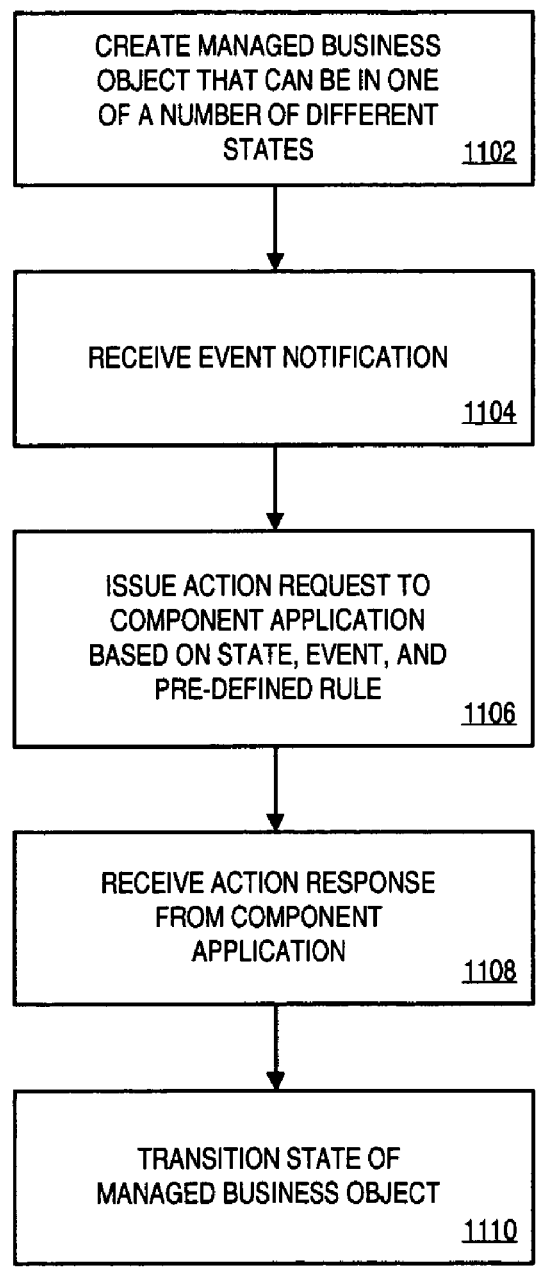
FIG. 11 is a flow chart of a control engine method according to some embodiments.

FIG. 11 is a flow chart of a control engine 1700 method according to some embodiments. At 1102, a managed business object is created. For example, information receive form a transaction modeling system 110 might be used to create a managed business object. As another example, a user might review a business process and identify a number of business objects associated with that process (e.g., contracts and cashflows). Moreover, each business object is associated with a plurality of pre-defined states (e.g., pending and closed). Information about the managed business object may then be provided to and stored by the control engine 1700.

At 1104, an event notification is received. For example, the control engine 1700 might receive an event notification indicating that a coupon payment is due (e.g., the event notification might be received from the transaction modeling system 110 or from a component application 910).

At 1106, an action request is issued to a component application 910 based on (i) the current a state of the managed business object, (ii) the event notification, and/or (iii) a pre-defined rule. The action request may be, for example, a request to the component application 910 asking it to perform some operation relating to a managed object. For example, the control engine 1700 might ask a component application to determine the current LIBOR value and re-calculate a payment amount associated with a contract obligation.

At 1108, an action response is received from the component application 910 (e.g., indicating that the action has been performed). For example, the component application 910 might send an action response to the control engine 1700 indicating that a payment amount has be re-calculated (e.g., and the result might be included in the action response or the component application 910 might have directly updated a shared contract database).

The state of the managed business object is transitioned at 1110 in accordance with the action response. For example, the control engine 1700 might transition the state of a managed business object from "pending" to "paid."

Figure 12:
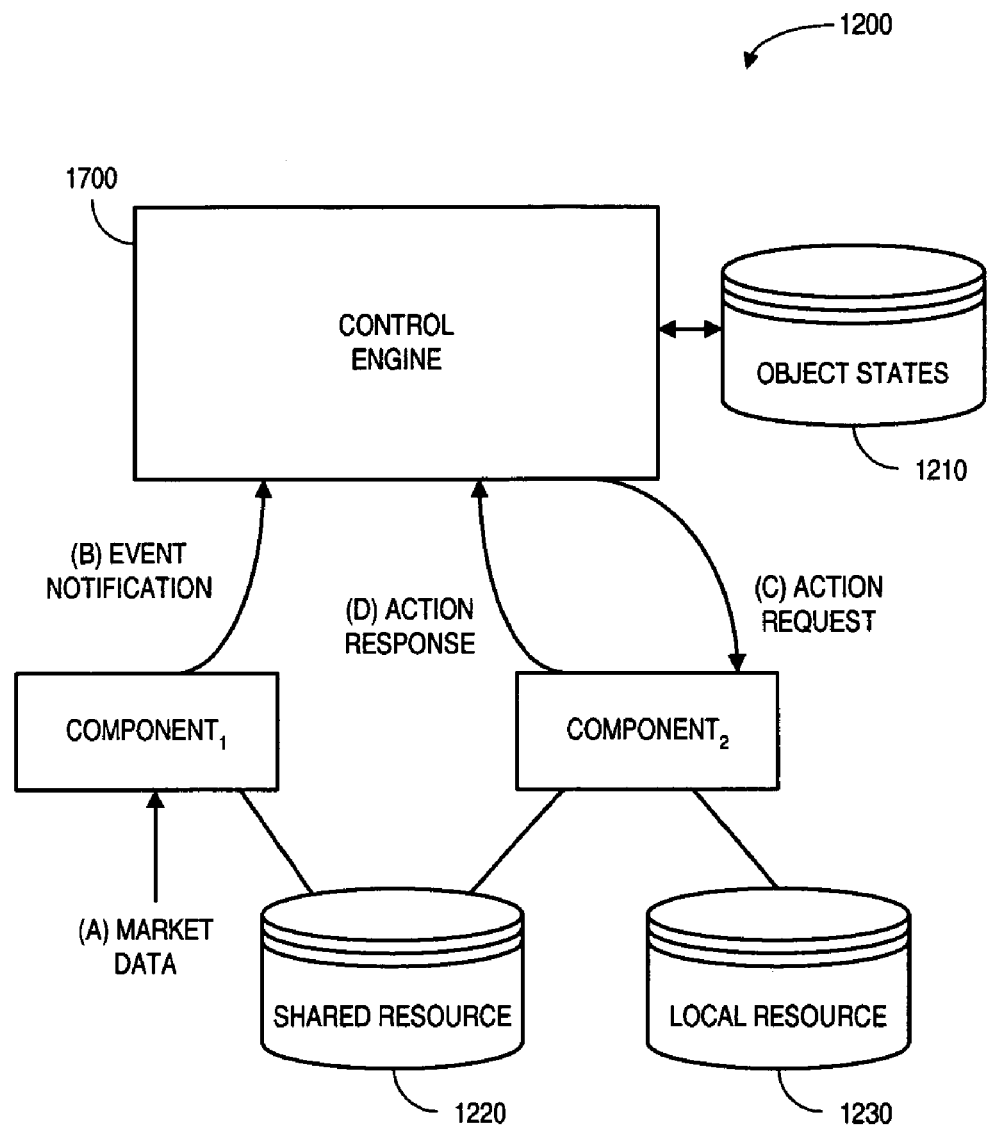
FIG. 12 is a flow diagram showing the interactions of component applications with the control engine as well as data that may be stored and communicated.

FIG. 12 is a flow diagram 1200 showing the interactions of component applications with the control engine 1700 as well as data that may be stored and communicated. In this case, the control engine 1700 exchanges information with Component$_1$ and Component$_2$.

At (A), Component$_1$ receives market data (e.g., such as by receiving a current stock price from a financial market service). At (B), Component$_1$ transmits an event notification to the control engine 1700 (e.g., indicating that the price of a stock has transitioned past a threshold value). According to some embodiments, an event notification might instead come from a transaction modeling system.

The control engine 1700 manages object states stored in a database 1210, and issues an action request to Component$_2$ (e.g., asking that shares of a stock should be sold) in response to the event notification and the current state of a business object. After the requested action is performed, Component$_2$ transmits an action response to the control engine 1700 at (D). The action response might, for example, indicate that an action has been completed or that an action will not be completed. According to some embodiments, the performance of an action is "guaranteed" (e.g., the action will be completed or an exception will be generated).

The control engine 1700 then updates the state of a managed object in the database 1210. Note that a shared resource 1220 (e.g., a contract database) might be accessible by multiple components while a local resource 1230 might be accessible by a single component.

Figure 13:
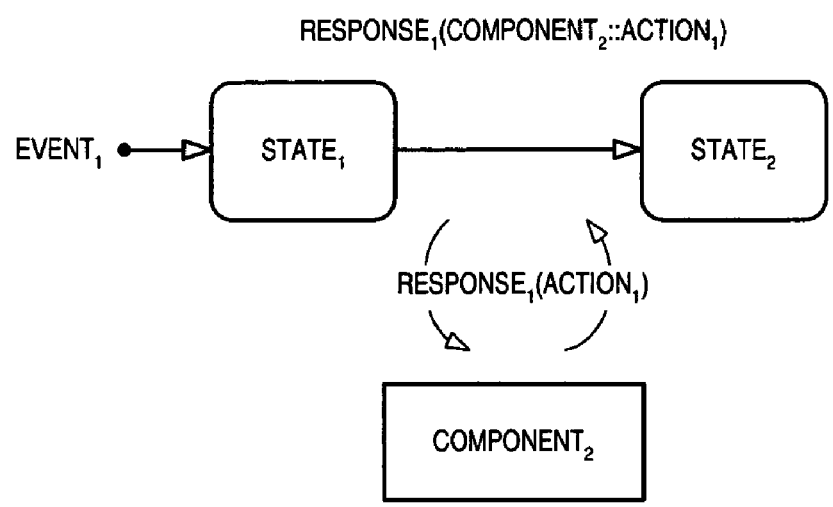
FIG. 13 is a state view according to some embodiments.

FIG. 13 is a state view according to some embodiments. The state view may represent, for example, use cases for a given managed object type. Each case may represent the actions and state transitions that can result from a given event being applied to a given initial state. In particular, FIG. 13 illustrates that a managed business object of this type will always transition from State$_1$ to State$_2$ when a Response$_1$ is received from Component$_2$ indicating that Action$_1$ has been performed.

Rule Database

Figure 14:
FIG. 14 is a tabular representation of a portion of a rule database according to one embodiment of the present invention.

Referring to FIG. 14 a table represents the rule database 1400 that may be accessed by the control engine 1700 according to an embodiment of the present invention. The table includes entries that define one or more rules. The table also defines fields 1402, 1404, 1406, 1408 for each of the entries. The fields specify: a Managed Object (MO) type 1402, a rule identifier 1404, a pre-condition 1406, and a post-condition 1408. The information in the rule database 1400 may be created and updated based on, for example, information received from the transaction modeling system 110 and/or a user.

The managed object type 1402 may be, for example, an alphanumeric code associated with a type of business object (e.g., a bond transaction). The rule identifier 1404 lets multiple rules be defined for each managed object type.

Each rule is associated with a pre-condition 1406 defining when the rule is triggered. The pre-condition 1406 may be associated with, for example, receiving an event notification (e.g., from the transaction modeling system 110), receiving an action response, a managed business object state transition, and/or Boolean operations. The post-condition 1408 defines what should happen when the pre-condition is satisfied. The post-condition 1408 might be associated with, for example, transitioning a managed business object state and/or issuing an action request.

In some cases, a rule is associated with a receipt of an event notification. For example, if the control engine 1700 receives an event notification of type "Event" referencing a managed object of type MO when the managed object is in State$_i$, the control engine 1700 might issue an action request of type "Action" to component "Component$_x$" referencing that managed object. This rule might be defined as:

Event(MO)+State$_i$(MO)→Component$_x$::Action(MO)

The control engine might instead transition the managed object to State$_j$:

Event(MO)+State$_i$(MO)→State$_j$(MO)

According to some embodiments, an event can reference one, and only one, managed object.

In other cases, a rule is associated with a receipt of an action response from a component application. For example, if the control engine 1700 receives an action response of type "Response" referencing an action request of type "Action" on a managed object of type MO from Component$_x$, when the managed object is in State$_i$, the control engine 1700 might transition the managed object to State$_j$:

Response(Action(MO))+State$_i$(MO)→State$_j$(MO)

Note that an action response might be scoped by managed object type, the current state, and the action request type. Moreover, in some embodiments, only a single action response is allowed to be pending for each managed object (e.g., and thus there is no need to identify the responding component).

In still other cases, when the control engine 1700 transitions a managed object of type MO to a particular State$_z$, an action request of type Action is issued to Component$_x$ referencing the managed object:

State$_z$(MO)→Component$_x$::Action(MO)

Note that such a rule can be "path-independent" (e.g., the action request is a function of the new state, not of how the new state was reached).

Control Engine Example

Figure 15:
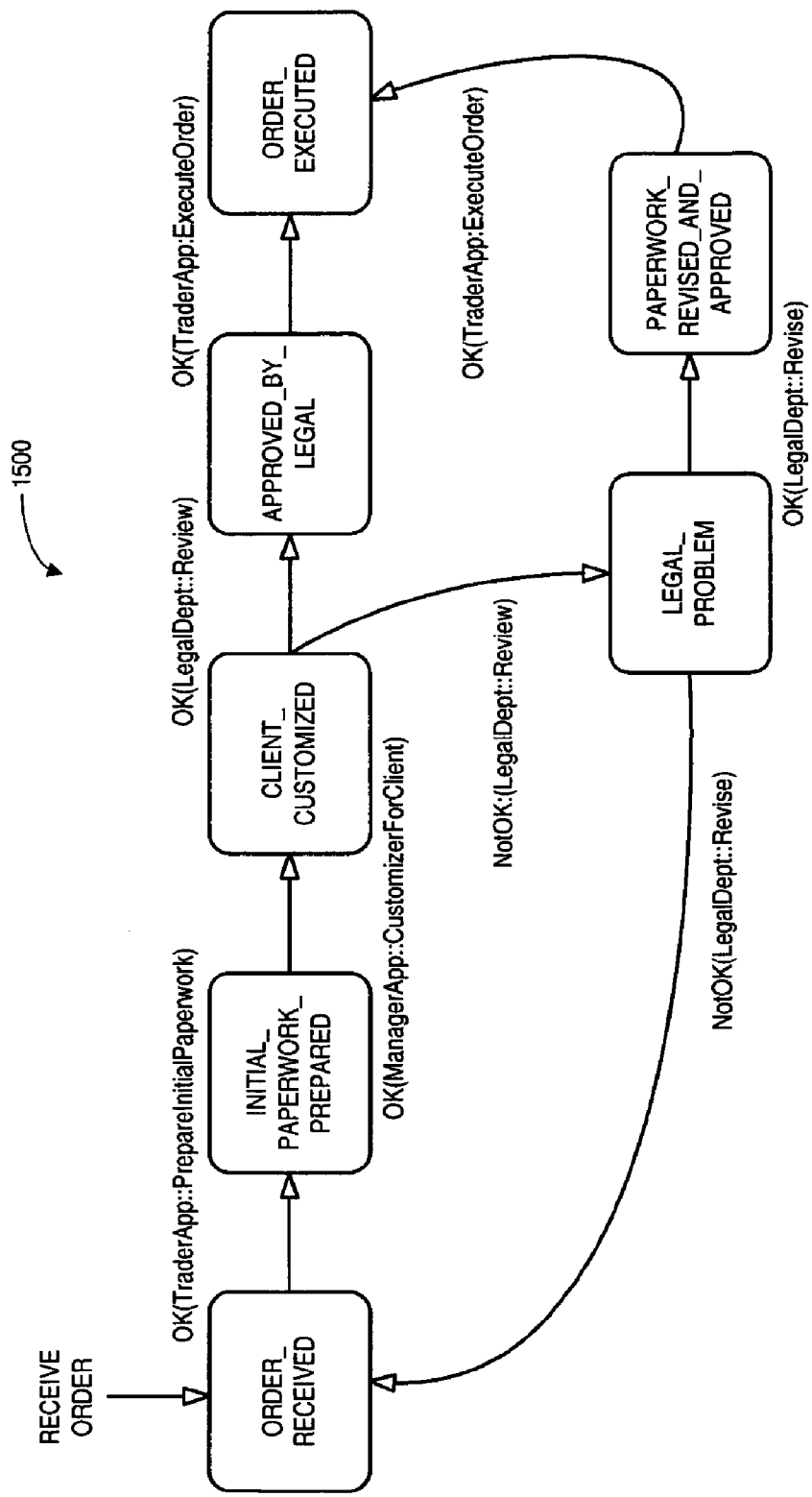
FIG. 15 is an example of state transitions according to one embodiment of the present invention.

FIG. 15 is an example 1500 of state transitions according to one embodiment of the present invention. In particular, when a "Receive Order" event notification occurs, the following rule causes the control engine 1700 to establish an instance of a managed business object and place that instance in state "ORDER_RECEIVED"

Receive Order→ORDER_RECEIVED

The following rule indicates that when the state ORDER_RECEIVED is entered, an action request is transmitted to a "TraderApp" component asking the component to prepare an initial set of paperwork:

ORDER_RECEIVED→TraderApp::PrepareInitialPaperwork( )

When the TraderApp component receives this action request, it might automatically generate and store a contract including pre-defined contact clauses. When the TraderApp component completes this task, it transmits the following action response to the control engine 1700: OK(TraderApp::PrepareInitialPaperwork).

Another rule defines that when the managed business object is in state RECEIVED_ORDER and an OK(TraderApp::PrepareInitialPaperwork) is received, the control engine 1700 will transition that object to state INITIAL_PAPERWORK_RECEIVED:

OK(TraderApp::PrepareInitialPaperwork)+
 ORDER_RECEIVED→INITIAL_PAPERWORK_
 RECEIVED Similarly, the control engine 1700 asks a ManagerApp component to customize the contract for the client and transitions the managed business object to state CLIENT_CUSTOMIZED after the ManagerApp transmits an action response indicating that the task is complete.

The control engine 1700 then asks a LegalDept component to review the contract (e.g., to determine that the contract meets regulatory requirements. In this case, however, two rules might apply:

OK(LegalDept::Review)+
    CLIENT_CUSTOMIZED→APPROVED_BY_LEGAL
NotOK(LegalDept::Review)+
    CLIENT_CUSTOMIZED→LEGAL_PROBLEM That is, the LegalDept may respond by indicating that the review is complete (and the contract is approved), in which case the control engine 1700 transitions the managed business object to state APPROVED_BY_LEGAL. The LegalDept can also respond by indicating that the contract is not approved (i.e., NotOK). In this case, the control engine 1700 transitions the managed business object to state LEGAL_PROBLEM. If the contract is approved by the LegalDept application (or if it revised and approved), the order is executed.

Figure 16:
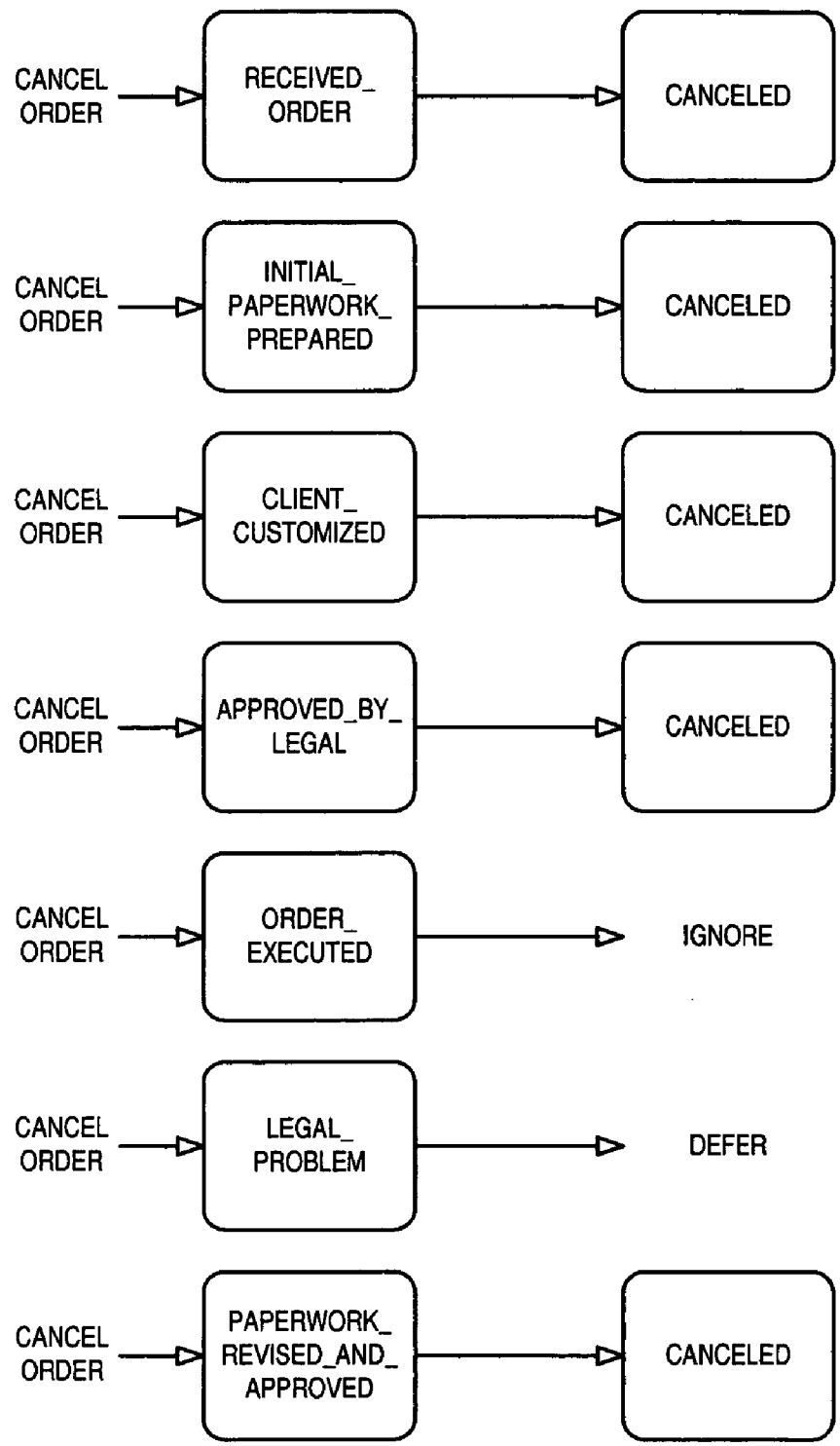
FIG. 16 illustrates additional state transitions according to one embodiment of the present invention.

FIG. 16 illustrates additional state transitions according to an embodiment of the present invention. In particular, when a "Cancel Order" event notification is received by the control engine 1700, the order may (or may not) be canceled based on the current state of the managed business object. For example, if the managed business object is in state INITIAL_PAPERWORK_PREPARED, the control engine 1700 transition the managed business object to state CANCELED. In other cases, however, the control engine 1700 will not honor the Cancel Order event notification (e.g., the event notification might be ignored or a decision might be deferred).

Control Engine Apparatus

Figure 17:
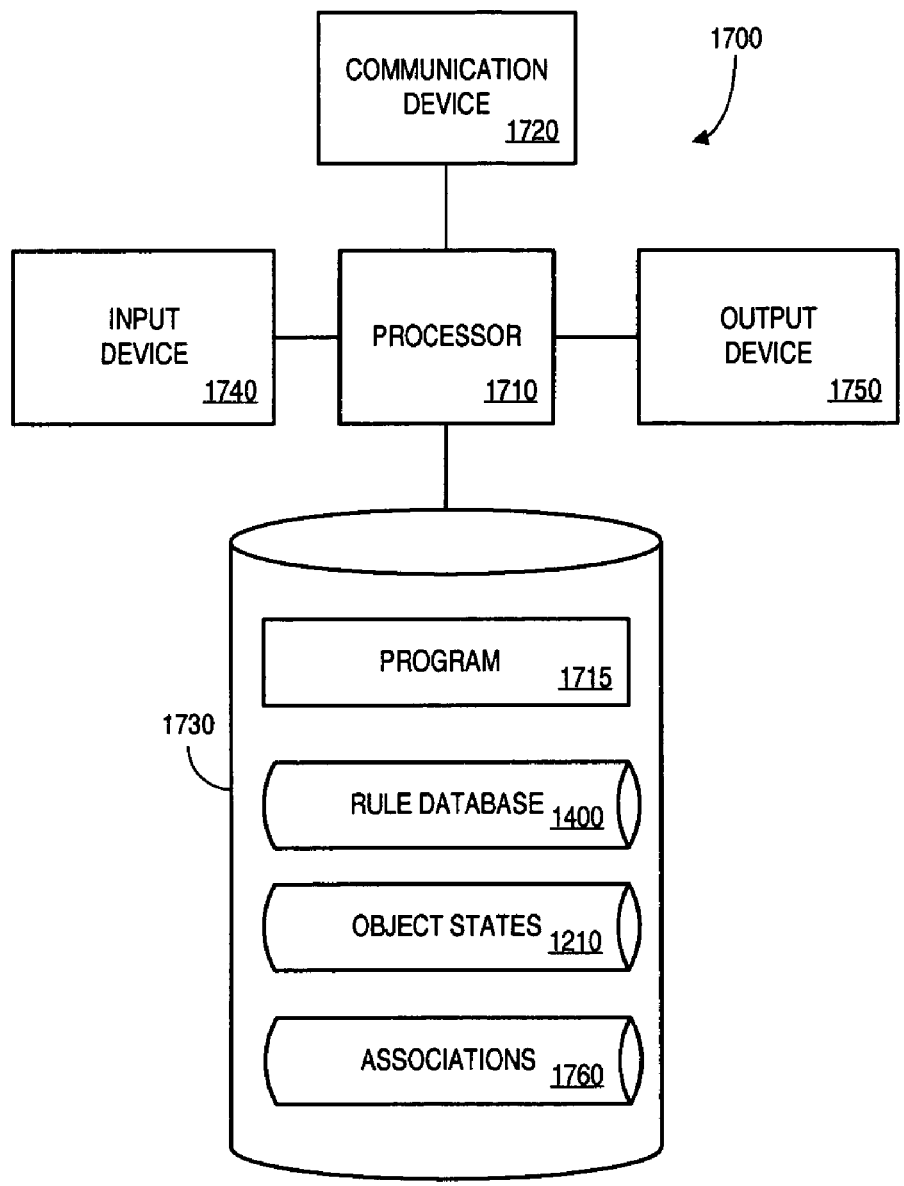
FIG. 17 is a block of a control engine according to some embodiments.

FIG. 17 is a block of a control engine 1700 according to some embodiments. The control engine 1700 includes a processor 1710, such as one or more INTEL® Pentium® processors, coupled to a communication device 1720 configured to communicate via a communication network (not shown in FIG. 17). The communication device 1720 may be used to communicate, for example, with one or more transaction modeling systems 110 and/or component application devices. Note that the control engine 1700 may exchange and/or process information, for example, associated with glueware, middleware, a database, an Application Protocol Interface (API), and/or a message format.

An input device 1740 (e.g., a computer mouse or keyboard) may be used to provide information to the control engine 1700 (e.g., so that a rule can be defined). An output device 1750 (e.g., a display device or printer) may be used to receive information from the control engine 1700.

The processor 1710 is also in communication with a storage device 1730. The storage device 1730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1730 stores a program 1715 for controlling the processor 1710. The processor 1710 performs instructions of the program 1715. For example, the processor 1710 may manage business object state transitions in accordance with any of the embodiments described herein.

As used herein, information may be "received" by or "transmitted" to, for example: (i) the control engine 1700 from a component application; or (ii) a software application or module within the control engine 1700 from another software application, module, or any other source.

As shown in FIG. 17, the storage device 1730 also stores a rule database 1400 (described with respect to FIG. 14) and object states 1210 (described with respect to FIG. 12). According to some embodiments, the storage device 930 further stores associations 1760. For example, the control engine 1700 might associate one managed business object with one or more other managed business objects. Consider a contract business object that is associated with thirty cashflow business objects. In this way, an event notification associated with the contract business object might automatically transition the states of the thirty cashflow business objects (e.g., when the contract is canceled all of the cashflows could be automatically canceled).

Component Applications

Figure 18:
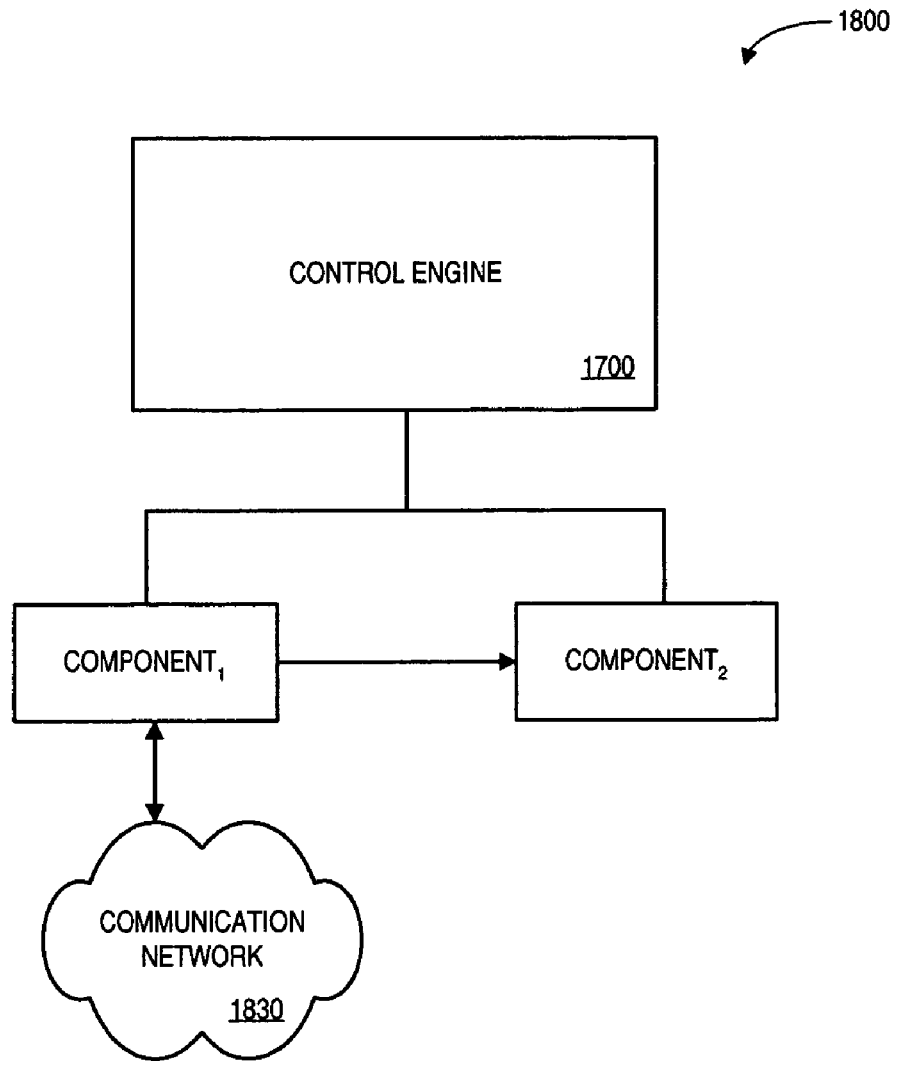
FIG. 18 is a block diagram overview of a system according to another embodiment of the present invention.

FIG. 18 is a block diagram overview of a system 1800 according to another embodiment of the present invention. As before, the control engine 1700 exchanges information one a number of application components. Note that one component might not even be aware of the existence of another component (although it may be aware of the control engine 1700, which in turn is aware of the other component). Moreover, an existing application might not need major modifications in order to interface with the control engine 1700.

According to some embodiments, Component$_1$ can also transmit information directly to Component$_2$. For example, the control engine 1700 might send an action request to Component$_1$ asking that a payment amount be re-calculated based on the current LIBOR rate. In this case, Component$_1$ accesses the current LIBOR rate via a communication network 1830. Moreover, Component$_1$ transmits the current LIBOR rate directly to Component$_2$ (which needs the information to respond to a future action request that will be generated by the control engine 1700). One advantage of such an approach is that the information does not need to transmitted from Component$_1$ to the control engine 1700 and then again from the control engine 1700 to Component$_2$. Moreover, Component$_2$ might be able to start processing the information even before receiving an action request from the control engine 1700.

Figure 19:
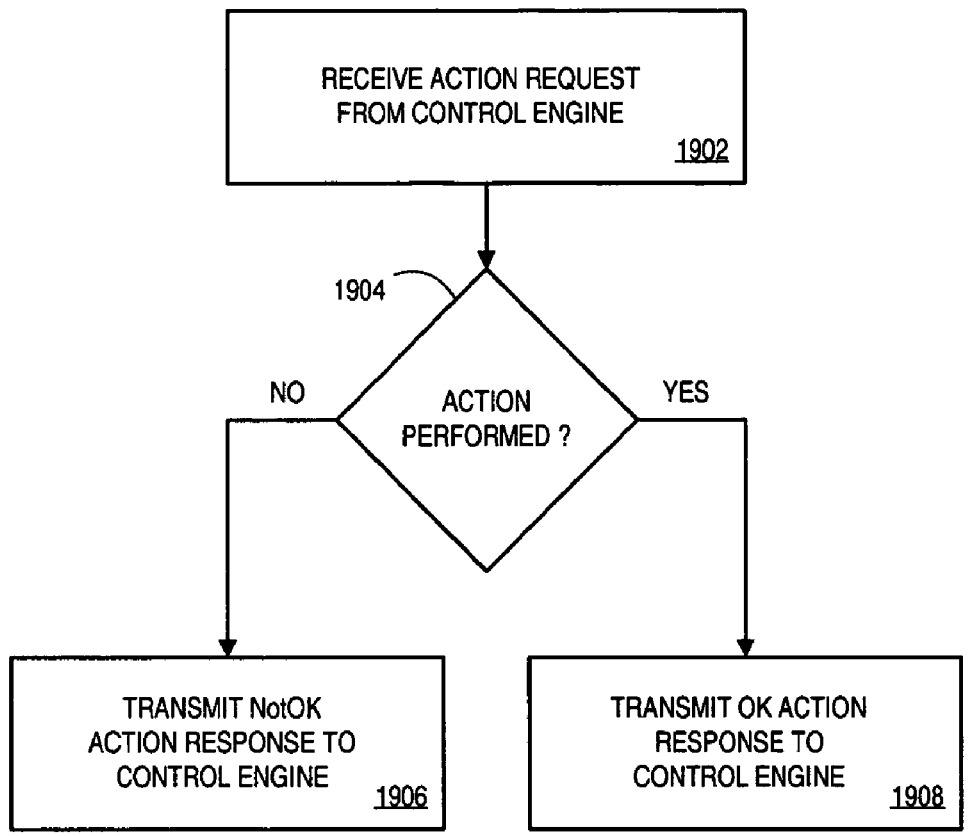
FIG. 19 is a flow chart of a component application method according to some embodiments.

FIG. 19 is a flow chart of a component application method according to some embodiments. At 1902, an action request is received from a control engine 1700. The action request might, for example, ask the component application to execute a function, such as a function that posts an event notification or executes an action related to a managed object (e.g., to generate a report using a template).

If the action is not performed at 1904, a NotOK action response is transmitted to the control engine 1700 at 1906. For example, a component application might not be able to perform an action because of a governmental regulation. If the action is performed at 1904, an OK action response is transmitted to the control engine 1700 at 1908. According to some embodiments, a system may consistently execute actions (e.g., the system may obey a rule or generate an exception when there is no applicable rule).

Thus, some embodiments may efficiently manage business objects. Moreover, the control application and related utilities may provide guaranteed, rule-based, properly ordered, consistent execution of functions by a set of independent components and the concomitant management of the states of a set of business objects, in response to potentially competing asynchronous events. In addition, the system is scalable (e.g., a large number of business objects may be managed) and the granularity of the objects and rules may be selected as appropriate.

Transaction Modeling Display

Figure 20:
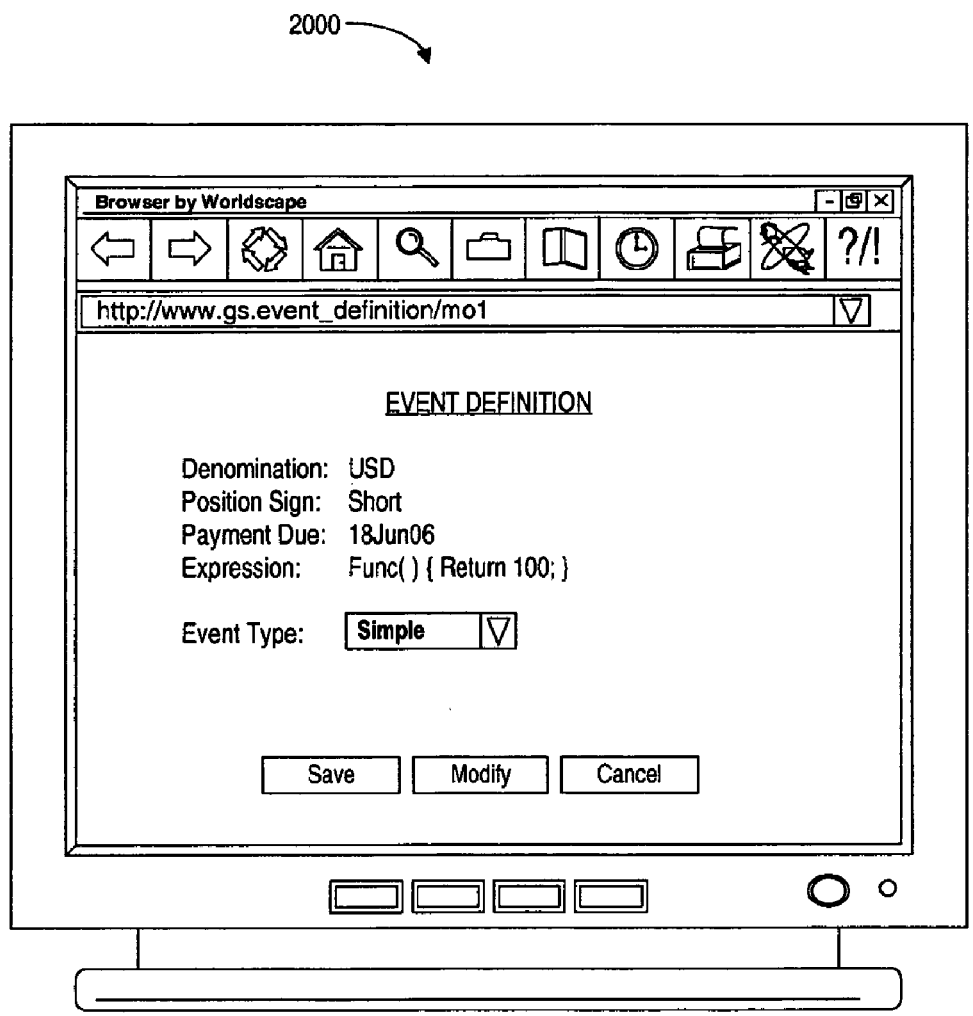
FIG. 20 illustrates a display according to one embodiment of the present invention.

FIG. 20 illustrates an information display 2000 (e.g., a computer monitor) according to one embodiment of the present invention. In particular, the display 2000 provides a user interface to facilitate the definition of events, such as simple events, contingent events, branch events, composite events, and/or financial observables. The user may also select to "Save" the event or financial observable, to "Modify" event or financial observable, and/or to "Cancel" the operation.

Additional Embodiments

The following illustrates various additional embodiments. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some examples have been described with respect to particular types of swap agreements, embodiments may be used with other types of transactions, including swap agreements associated with a forward straddle and/or a constant maturity swap.

Moreover, some embodiments have been described herein with respect to specific types of managed business objects, but the present invention may be used in connection with any other type of managed business object. In addition, the specific financial observables, events, and rules provide herein are merely for illustration and embodiments may be associated with other types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   automatically managing, via a processor of a financial transaction modeling system, a financial transaction during the financial transaction's lifecycle based on a first financial model of a plurality of financial models defined in the financial transaction modeling system,
   wherein the first financial model is defined to include simple events, at least one branch event, and at least one composite event,
   wherein the simple events describe one or more asset transfers including transfer amounts and transfer dates, the at least one branch event describes a branch date and a branch selector defining a condition indicating which of one or more associated simple events will occur, and the at least one composite event links two or more events of the simple events and the at least one branch event, and
   wherein automatically managing the financial transaction includes:
   creating one or more managed business objects associated with multiple pre-defined states;
   receiving an event notification associated with at least one of the events;
   issuing an action request to a component application based on (i) a current state of the managed business object, (ii) the event notification, or (iii) a pre-defined rule;
   receiving an action response from the component application; and
   transitioning the state of the managed business object in accordance with the action response.

2. The method of claim 1, wherein the financial transaction is associated with at least one of: (i) an identifier, (ii) a contract, (iii) a swap agreement, (iv) a fixed/floating swap agreement, (v) a cancelable swap agreement, (vi) a trigger cancelable swap agreement, (vii) a loan, (viii) a security, (ix) a financial instrument, (x) an insurance contract, or (xi) a derivative contract.

3. The method of claim 1, wherein at least one of the simple events is further associated with one or more of: (i) an identifier, (ii) a denomination, (iii) a position indication, or (iv) a payment date.

4. The method of claim 1, wherein at least one asset transfer is associated with at least one of: (i) a cashflow, (ii) an equity transfer, or (iii) a debt transfer.

5. The method of claim 1, further comprising:
   calculating a financial value associated with the financial transaction based at least in part on at least one simple event, the at least one branch event, and the at least one composite event.

6. The method of claim 5, wherein the financial value is associated with at least one of: (i) an identifier, (ii) a net present value, (iii) a risk amount, (iv) a Monte Carlo simulation, (v) a credit valuation adjustment, (vi) a recursive calculation, (vii) a discount value, or (viii) a cashflow amount.

7. The method of claim 6, wherein the calculation is based on a pricing date.

8. The method of claim 7, wherein the financial transaction's lifecycle starts at a start date and ends at an end date, and the pricing date is between the start date and the end date.

9. The method of claim 7, wherein the pricing date is not the current date.

10. The method of claim 7, wherein the calculation is based on (i) a financial observable known as of the pricing date and (ii) an economically optimized action or decision.

11. The method of claim 1, further comprising:
    defining the simple events associated with the financial transaction;
    defining the at least one branch event associated with the financial transaction;
    defining the at least one composite event associated with the financial transaction; and
    defining at least one contingent event associated with at least one of the simple events, the at least one contingent event including a contingency date and a contingency selector based on information provided by a party to the financial transaction, wherein the financial transaction is further managed based on the contingent event.

12. The method of claim 11, wherein the at least one contingent event is further associated with at least one of (i) an identifier, (ii) an option, or (iii) a position indication.

13. The method of claim 1, wherein at least one of the events are associated with a financial observable.

14. The method of claim 13, wherein the financial observable is associated with at least one of (i) an identifier, (ii) a published value, (iii) an observation date, (iv) an 10 interest rate, (v) a financial security, (vi) a market price, (vii) a weather condition.

15. The method of claim 14, wherein the financial observable is determined based on market information received via a communication network.

16. The method of claim 1, wherein the risk associated with the financial transaction comprises at least one of: (i) risk management, (ii) market risk, (iii) interest rate risk, or (iv) credit risk.

17. The method of claim 1, wherein said managing comprises at least one of: (i) automatically transferring an asset, (ii) automatically transmitting an indication to a party of the financial transaction, (iii) canceling a transaction, (iv) extending a transaction, or (v) receiving supplemental information from a party associated with a transaction.

18. The method of claim 1, wherein a plurality of managed business objects co-exist.

19. The method of claim 1, wherein the event notification is associated with at least one of: (i) an asynchronous event, (ii) one of a plurality of potentially competing event notifications, (iii) a component application-generated event notification, (iv) a realworld condition, (v) financial market information, or (vi) an irrefutable event.

20. The method of claim 1, wherein there are a plurality of pre-defined rules.

21. The method of claim 1, wherein the pre-defined rule includes a pre-condition and a post-condition.

22. The method of claim 21, wherein the pre-condition is associated with at least one of: (i) receiving an event notification, (ii) receiving an action response, or (iii) a managed business object state transition.

23. The method of claim 21, wherein the post-condition is associated with at least one of: (i) transitioning a managed business object state, or (ii) issuing another action request.

24. The method of claim 1, wherein the action response indicates at least one of: (i) that an action has been completed, or (ii) that an action will not be completed.

25. The method of claim 1, wherein action requests are transmitted to and action responses are received from a plurality of independent component applications, and a first component application directly exchanges information with a second component application.

26. A non-transitory computer readable medium storing instructions, wherein the instructions, when executed by a processor of a financial transaction modeling system, cause the processor to:
automatically manage a financial transaction during the financial transaction's lifecycle based on a first financial model of a plurality of financial models defined in the financial transaction modeling system,
wherein the first financial model is defined to include simple events, at least one branch event, and at least one composite event,
wherein the simple events describe one or more asset transfers including transfer amounts and transfer dates, the at least one branch event describes a branch date and a branch selector defining a condition indicating which of one or more associated simple events will occur, and the at least one composite event links two or more events of the simple events and the at least one branch event, and
wherein to automatically manage the financial transaction, the processor:
creates one or more managed business objects associated with multiple pre-defined states;
in response to receiving an event notification associated with at least one of the events, issues an action request to a component application based on (i) a current state of the managed business object, (ii) the event notification, or (iii) a pre-defined rule; and
in response to receiving an action response from the component application, transitions the state of the managed business object in accordance with the action response.

27. A transaction modeling system comprising:
a processor; and
a storage device storing instructions that when executed by said processor, cause the transaction modeling system to:
automatically manage a financial transaction during the financial transaction's lifecycle based on a first financial model of a plurality of financial models defined in the financial transaction modeling system,
wherein the first financial model is defined to include simple events, at least one branch event, and at least one composite event,
wherein the simple events describe one or more asset transfers including transfer amounts and transfer dates, the at least one branch event describes a branch date and a branch selector defining a condition indicating which of one or more associated simple events will occur, and the at least one composite event links two or more events of the simple events and the at least one branch event, and
wherein automatically managing the financial transaction includes:
creating one or more managed business objects associated with multiple pre-defined states,
identifying an event notification associated with at least one of the events;
issuing an action request to a component application based on (i) a current state of the managed business object, (ii) the event notification, or (iii) a pre-defined rule,
identifying an action response from the component application, and
transitioning the state of the managed business object in accordance with the action response.

28. The transaction modeling system of claim 27, further comprising:
an input device;
an output device; and
a transaction database.

* * * * *